United States Patent [19]

McLeod

[11] 4,204,265
[45] May 20, 1980

[54] STATIC CONVERTER SUITABLE FOR HIGH INPUT VOLTAGE APPLICATIONS

[76] Inventor: James A. McLeod, 224 Unit N, Red Oak Dr. East, Sunnyvale, Calif. 94086

[21] Appl. No.: 933,157

[22] Filed: Aug. 14, 1978

[51] Int. Cl.² .................................... H02M 7/537
[52] U.S. Cl. .................................. 363/71; 363/136
[58] Field of Search ................. 307/82; 363/71, 72, 363/131, 132

[56] References Cited
U.S. PATENT DOCUMENTS

| | | | |
|---|---|---|---|
| 3,257,604 | 6/1966 | Colclaser et al. | 363/132 |
| 3,846,695 | 11/1974 | Genuit et al. | 363/71 |

Primary Examiner—William M. Shoop
Attorney, Agent, or Firm—Claude A. S. Hamrick

[57] ABSTRACT

Two or more static converter switching circuits are connected in series across an input voltage source and have their primaries wound on a single power transformer core. Each converter circuit includes a current primary winding so as to limit the current through the power switches during the switching periods. The circuit arrangement allows equal input voltage distribution across the power switches and controls the current rise through each power switch during the turn ON and turn OFF times.

10 Claims, 1 Drawing Figure

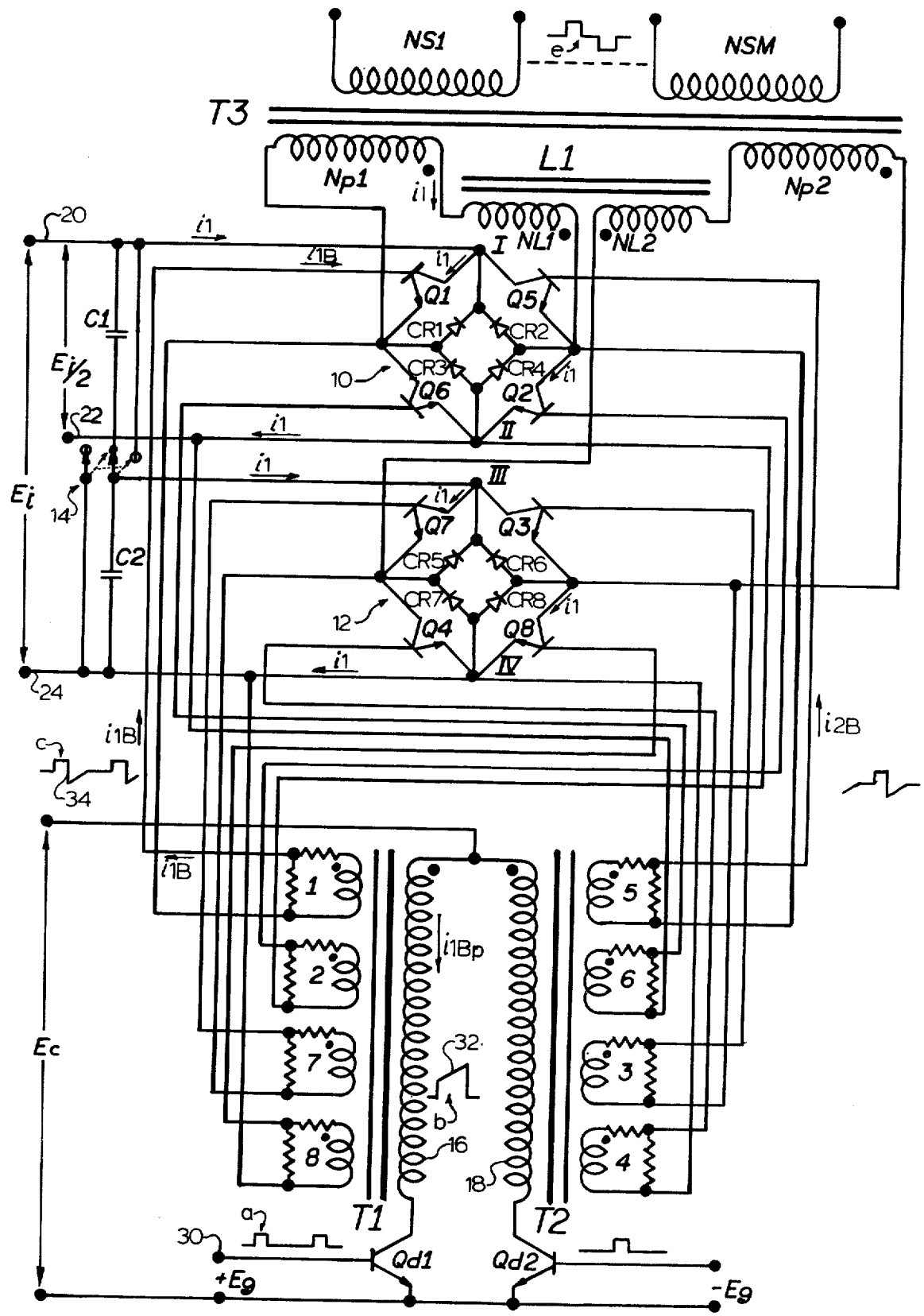

STATIC CONVERTER SUITABLE FOR HIGH INPUT VOLTAGE APPLICATIONS

BACKGROUND OF THE INVENTION

1. Field of the Invention

The present invention relates generally to static converters and more particularly to a static converter having the ability to accommodate a high input voltage that would ordinarily be excessive for a conventional static converter.

2. Description of the Prior Art

One of the important factors that must be considered in the use of a static converter is whether or not it can safely handle available power supply voltages. For example, in some European systems the available power from a three-phase rectified source will exceed 500 volts nominal. Since the maximum voltage that normally-used transistors can handle is less than 400 volts, most regular converters cannot handle such high source voltages without exceeding the breakover limits of the switching transistors.

Although attempts have been made to connect two conventional bridge converters in series in order to solve the high voltage problem, it has been found that during those times that both converters are OFF, the voltages are not equally divided among the transistors will be exceeded and cause it to break over.

The subject matter of the present invention is related to that disclosed in my previously issued U.S. Pat. No. 4,042,872, and the entire disclosure thereof is hereby incorporated by reference into this application.

SUMMARY OF THE PRESENT INVENTION

It is therefore a principal object of this invention to provide a novel static converter which is capable of handling supply voltages which exceed the breakover voltage of the switching devices utilized.

Briefly, a preferred embodiment of the present invention includes a pair of power switching bridge circuits, a common output transformer that has a primary winding for each bridge circuit and conventional secondary output circuits, an input capacitor connected across each bridge, a current balance inductor connected in series with each primary winding of the output transformer, two power switch drive transformers and a pair of drive transistors that can be driven from a low power rectangular wave source.

Other objects and advantages of the present invention will no doubt become apparent to those skilled in the art following a reading of the following detailed description of the preferred embodiment which is illustrated in the accompanying drawings.

IN THE DRAWING

The FIGURE is a schematic diagram illustrating a static converter in accordance with the present invention.

DETAILED DESCRIPTION OF THE PREFERRED EMBODIMENT

Referring now to the drawing, there is shown a preferred embodiment of a static converter circuit that can alternatively handle excessively high supply voltages. As illustrated, the circuit includes two converter subcircuits which share a common pair of drive transformers and a common output transformer, and are alternatively connectable in either series or parallel configuration.

More specifically, the circuit includes a pair of drive transistors Qd1 and Qd2, a pair of drive transformers T1 and T2, a first bridge circuit 10, a second bridge circuit 12, a bridge switching means 14, a current balancing indicator L1, and an output transformer T3. The transformer T1 includes a primary winding 16 that is connected in series with the drive transistor Qd1, the two being connected across a voltage source Ec, and four secondary windings 1, 2, 7 and 8 which are respectively coupled in driving relationship to the power transistors Q1 and Q2 of bridge 10 and the power transistors Q7 and Q8 of bridge 12. Similarly, the transformer T2 includes a primary winding 18 that is connected in series with the drive transistor Qd2, the two also being connected across source Ec, and four secondary windings 3, 4, 5 and 6 which are respectively coupled in driving relationship to the power transistors Q3 and Q4 of bridge 12 and the power transistors Q5 and Q6 of bridge 10.

As illustrated in the drawing, bridges 10 and 12 include 8 power transistors Q1 thru Q8 and 8 diodes CR1 thru CR8. The transistors Q1, Q2, Q7 and Q8 are polarized such that when rendered conductive by signals received from transformer T1 will complete a circuit from power supply terminal 20 thru transistor Q1, in one direction, thru T3 primary winding Np1 and current balancing inductor winding NL1, and thru transistor QL to terminal 22. From terminal 22 the path continues thru Q7 in the same direction, through balancing inductor winding NL2, T3 primary winding Np2 and thru Q3 to terminal 24.

The transistors Q5, Q6, Q3 and Q4 are polarized such that when rendered conductive by signals received transformer T2 on the opposite half cycle will complete a circuit from power supply terminal 20 thru transistor Q5 in the opposite direction thru current balancing inductor winding NL1, thru T3 transformer winding Np1, and thru Q6 to terminal 22. From terminal 22 this path continues thru Q3 in the opposite direction thru T3 primary Np2, thru balancing inductor winding NL2 and thru Q4 to terminal 24.

In addition to the primary windings Np1 and Np2 which are wound in series aiding relationship, and the primary windings NL1 and NL2 which are wound in series opposing relationship to each other, transformer T3 also includes a plurality of output secondary windings NS1-NSn which are adapted for connection to various loads.

The switch 14 is a double pole—double throw device which in the position illustrated in solid lines couples the bridges 10 and 12 in series across power supply terminals 20 and 24, and which in the opposite position shown in dashed lines couples the bridges 10 and 12 in parallel across power supply materials 20 and 22.

Assuming that Qd1 has been gated into saturation by the positive-going current waveform "a" of the drive signal Eg applied to terminal 30, a current having a waveform resembling that shown at "b" will be established in primary 16. The rising portion 32 of this waveform represents the magnetizing current of the transformer T1. The primary current i1Bp will then induce a current i1B in the secondary windings 1, 2, 7 and 8 which will have a waveform resembling that shown at "c". Note that at termination of the pulse "a" the stored energy in T1 (stored as a result of the magnetizing current) will cause the current i1B to have a reverse current component 34 which will cause a back biasing of the power transistors Q1, Q2, Q7 and Q8, and give rise to faster turn off. As illustrated, the current i1B will cause a current i1 to flow through the circuit along the path illustrated.

Similarly, when Qd2 is gated ON the T2 secondaries will be energized with a current having a waveform "d" similar to waveform "c" but displaced in time, and this current will turn ON transistors Q3, Q4, Q5 and Q6 to create a current in transformer T3 and indicator L1 which is in a direction opposite to that of i1. Obviously, the magnitude and waveform shape of the currents developed in the primary of T3 will be primarily determined by T3 magnetizing current and the secondary load, but such currents may be generally represented by the output waveform "e".

Since the windings Np1 and Np2 are wrapped around a common core, the voltage across each will be determined by the turns ratio between them. Moreover, since the number of turns in Np1 is equal to that of Np2, each winding will absorb ½ of the input voltage Ei.

Capacitors C1 and C2 are relatively small capacitors which are used to maintain a balanced voltage across each bridge during the converter switching means. For unity ratio between Np1 and Np2, capacitors C1 and C2 will each support ½ of the input voltage E1.

Note that there is normally a difference in the turn ON and turn OFF times of the converter power transistors Q1–Q8, and as a consequence one converter bridge is likely to turn ON and/or OFF before the other one with the result being that the ON bridge must switch the total load current, i.e., twice its normal operating current in this case.

Since the windings on inductor L1 are series opposing and of equal turns, the total flux linkages in the core will be 0 and thus no voltage drop will occur across the current transformer when both converters are in the ON state during a particular ½ cycle. However, when one converter turns OFF prior to the turn-off of the other, the balancing inductor winding in series with the still conducting converter will absorb voltage because there is no cancellation flux from the other inductor winding. Thus, the current rise through the still conducting converter bridge, i.e., that which would normally take place without the current transformer, is now restricted by the inductance of L1.

The purpose of CR1 through CR8 is to present paths back to C1 and C2 for any energy stored in T3 and L1 at the time the converters turn off. With equal voltages across C1 and C2, the voltage across each bridge will thus be ½ the input voltage Ei.

In the event that it should be desirable to operate from a nominal input voltage that is approximately ½ of Ei, the two converters can be connected in parallel to each other by merely moving the contact arms of switch 14 to the position shown in dashed lines. This will cause circuit node I to be connected to node III and node II to be connected to node IV. In this case the secondary outputs and the primary voltage and currents will remain essentially unchanged.

Although the present invention has been described in terms of a single embodiment, it is contemplated that numerous alterations and modifications of the illustrated circuit will become apparent to those skilled in the art. It is therefore intended that the appended claims be interpreted as covering all such alterations and modifications as fall within the true spirit and scope of the invention.

What is claimed is:

1. A static converter, comprising:
 first and second input terminals across which a power supply potential may be applied;
 drive signal generating means for developing first and second drive signals that are 180° out of phase relative to each other;
 output transformer means including first and second primary windings wound about a common magnetic core, and at least one secondary winding across which a load may be connected;
 current balancing inductor means including first and second inductor windings wound in opposite directions about a common magnetic core; and
 first and second bridge means connected across said first and second terminals, said first and second bridge means being responsive to said first drive signal and operative to couple a first circuit including said first primary winding and said first inductor winding connected in series, and a second circuit including said second primary winding and said second inductor winding connected in series across said first and second pair of input terminals such that current flows therethrough in one direction, said first and second bridge means being responsive to said second drive signal and operative to couple said first circuit and said second circuit across said first and second pair of input terminals such that current flows therethrough in the opposite direction, said inductor windings insuring that during the switching times the current through the last bridge to turn OFF or through the first bridge to turn ON will be held to a predetermined level.

2. A static converter as recited in claim 1 wherein said first and second bridge means are connected in series across said first and second input terminals.

3. A static converter as recited in claim 1 wherein said first and second bridge means are connected in parallel across said first and second input terminals.

4. A static converter as recited in claim 1, 2 or 3 and further comprising first capacitor means connected across the power supply side of said first bridge means and second capacitor means connected across the power supply side of said second bridge means, said first and second capacitor means serving to maintain a balanced voltage across each bridge during the converter switching times.

5. A static converter as recited in claim 1 and further comprising switching means for selectively connecting said first and second bridge means in series or in parallel across said first and second input terminals.

6. A static converter as recited in claim 1, 2, 3 or 5 wherein said first bridge means includes a first circuit junction connected to said first input terminal, a second circuit junction, a third circuit junction connected to one end of said first circuit and a fourth circuit junction connected to the other end of said first circuit.

7. A static converter as recited in claim 6 wherein said second bridge means includes a fifth circuit junction connected to said second circuit junction, a sixth circuit junction, connected to said second input terminal means, a seventh circuit junction connected to one end of said second circuit and an eighth circuit junction connected to the opposite end of said second circuit.

8. A static converter as recited in claim 7 wherein said first bridge means includes first switching means connected between said first and third circuit junctions, second switching means connected between said fourth and second circuit junctions, third switching means connected between said first and fourth circuit junctions, and fourth switching means connected between said third and second circuit junctions, said first and second switching means being responsive to said first drive signal and said third and fourth switching means being responsive to said second drive signal.

9. A static converter as recited in claim 8 wherein said second bridge means includes fifth switching means connected between said fifth and seventh circuit junctions, sixth switching means connected between said sixth and eighth circuit junctions, seventh switching means connected between said fifth and eighth circuit junctions, and eighth switching means connected between said seventh and sixth circuit junctions, said fifth and sixth switching means being responsive to said first drive signal and said seventh and eighth switching means being responsive to said second drive signal.

10. A static converter as recited in claim 4 and further comprising switching means for selectively converting said first and second bridge means in series or in parallel across said first and second input terminals.

* * * * *